United States Patent

Yokoyama et al.

[11] Patent Number: 5,749,983
[45] Date of Patent: May 12, 1998

[54] PNEUMATIC TIRE WITH CAP AND BASE STRUCTURE

[75] Inventors: Hideaki Yokoyama, Toda; Uchu Mukai, Kodaira, both of Japan

[73] Assignee: Bridgestone Corporation, Tokyo, Japan

[21] Appl. No.: 565,395

[22] Filed: Nov. 30, 1995

[30] Foreign Application Priority Data

Nov. 30, 1994 [JP] Japan ............................ 6-296657
Nov. 27, 1995 [JP] Japan ............................ 7-307919

[51] Int. Cl.⁶ .............................. B60C 1/00; B60C 11/00
[52] U.S. Cl. ................................. 152/209 R; 525/237
[58] Field of Search ..................... 152/209 R, 209 D; 525/232, 233, 236, 237

[56] References Cited

U.S. PATENT DOCUMENTS

| | | | |
|---|---|---|---|
| 3,759,306 | 9/1973 | Greiner et al. | 152/209 R |
| 4,487,892 | 12/1984 | Ohmori et al. | 525/237 |
| 4,791,178 | 12/1988 | Fujimaki et al. | 152/209 R |
| 4,945,964 | 8/1990 | Takiguchi et al. | 152/209 R |
| 5,064,905 | 11/1991 | Stamhuis et al. | 525/237 |
| 5,157,082 | 10/1992 | Johson | 525/237 |
| 5,284,195 | 2/1994 | Sanstrom et al. | 152/209 R |
| 5,378,754 | 1/1995 | Bauer et al. | 152/209 R |

FOREIGN PATENT DOCUMENTS

| | | |
|---|---|---|
| 0 089 839 | 9/1983 | European Pat. Off. . |
| 0 505 904 | 9/1992 | European Pat. Off. . |
| 2362627 | 6/1975 | Germany .......... 152/209 R |
| 145744 | 11/1980 | Japan .......... 152/209 R |
| 128904 | 8/1983 | Japan .......... 152/209 R |

*Primary Examiner*—Steven D. Maki
*Attorney, Agent, or Firm*—Sughrue, Mion, Zinn, Macpeak & Seas, PLLC

[57] ABSTRACT

A pneumatic tire comprises a tread of cap and base structure, in which a rubber composition comprising a particular amount of a specified rubber-reinforcing thermoplastic resin containing not less than 10% by weight of a conjugated diene rubber component and the balance being a resin component and having a particular glass transition temperature is used in a tread base rubber of the tread and has excellent chipping resistance, cut resistance and durability to heat build-up.

8 Claims, 1 Drawing Sheet

PNEUMATIC TIRE WITH CAP AND BASE STRUCTURE

BACKGROUND OF THE INVENTION

1. Field of the Invention

This invention relates to pneumatic tires, and more particularly to an improvement of a tread base rubber in a pneumatic tire having a tread of cap and base structure.

2. Description of the Related Art

Recently, as service conditions of a pneumatic tire become severer, many performances are required in a tread rubber of the tire and hence the requirement is advanced highly.

As a countermeasure for satisfying the above requirement, therefore, there is used a tread rubber of cap and base structure in which each of the cap rubber layer and base rubber layer develops important properties inherent to each layer and compensates for properties lacking in each layer with each other.

Lately, it is increasingly demanded to further improve the wear resistance of the tire. For this purpose, synthetic rubber having a good wear resistance, or carbon black having a smaller particle size or high-grade carbon black is used in a tread cap rubber. As a result, heat build-up of the tread cap rubber undesirably increases, so that it is attempted to increase a volume of a tread base rubber having a low heat build-up as far as possible. In this case, the thickness of the tread cap rubber is fairly decreased as compared with that of the tread base rubber and hence the tread cap rubber is completely worn to expose the underlayer of the tread base rubber in a ground contact region when the tire is run in a relatively short time. Therefore, it is required to set the wear resistance of the tread base rubber to a level near to the wear resistance of the tread cap rubber. In general, the tread base rubber is required to have the wear resistance corresponding to not less than 75% the wear resistance required in the tread cap rubber.

Therefore, the aforementioned high-grade carbon black having a good wear resistance is used as a carbon black to be used in the tread base rubber, while in order to further lower the heat build-up of the tread base rubber, the amount of carbon black used is reduced by replacing a part of the carbon black used with a mixed filler of silica and silane.

However, when the silica-silane mixed filler is incorporated into the tread base rubber, the difference in Young's modulus between the tread base rubber and the tread cap rubber becomes larger and hence it is apt to cause a phenomenon of chipping off a rubber piece from the tread cap rubber (which is generally called a chipping).

Furthermore, it is attempted to simply reduce the amount of the carbon black used without incorporating the silica-silane mixed filler into the tread base rubber in order to improve the low heat build-up of the tread base rubber. In this case, however, the fracture resistance of the tread base rubber lowers and hence it is apt to cause tearing breakage and also durability to heat build-up in the tread base rubber is degraded, so that it is difficult to put this attempt into practical use.

On the other hand, the tread base rubber is required to be hard at a low strain but relatively soft at a high strain for improving the fracture resistance of the tread base rubber in the pneumatic tire having a tread of cap and base structure.

SUMMARY OF THE INVENTION

It is, therefore, an object of the invention to solve the aforementioned problems of the conventional technique and to provide a pneumatic tire having a tread of cap and base structure in which chipping resistance, fracture resistance and durability to heat build-up are excellent in a tread base rubber.

The inventors have made various studies and found that the above object can be attained by compounding a particular rubber-reinforcing thermoplastic resin in the tread base rubber and as a result the invention has been accomplished.

According to the invention, there is the provision of a pneumatic tire having a tread of cap and base structure, characterized in that a rubber composition comprising 2–50 parts by weight of a rubber-reinforcing thermoplastic resin, which comprises not less than 10% by weight of a conjugated diene rubber component and the balance being a resin component having a glass transition temperature (Tg) of 100°–140° C., based on 100 parts by weight of rubber ingredient is used in a tread base rubber of the tread.

In a preferable embodiment of the invention, the rubber-reinforcing thermoplastic resin contains 40–65% by weight of the conjugated diene rubber component.

In another preferable embodiment of the invention, the conjugated diene rubber component is polybutadiene rubber or styrene-butadiene copolymer rubber having a toluene insoluble matter of not more than 5%.

In the other preferable embodiment of the invention, the resin component in the rubber-reinforcing thermoplastic resin is made from at least one vinyl monomer selected from acrylonitrile, styrene and α-methylstyrene.

BRIEF DESCRIPTION OF THE DRAWING

The invention will be described with reference to the accompanying drawing, wherein.

DESCRIPTION OF THE PREFERRED EMBODIMENTS

Figure 1:
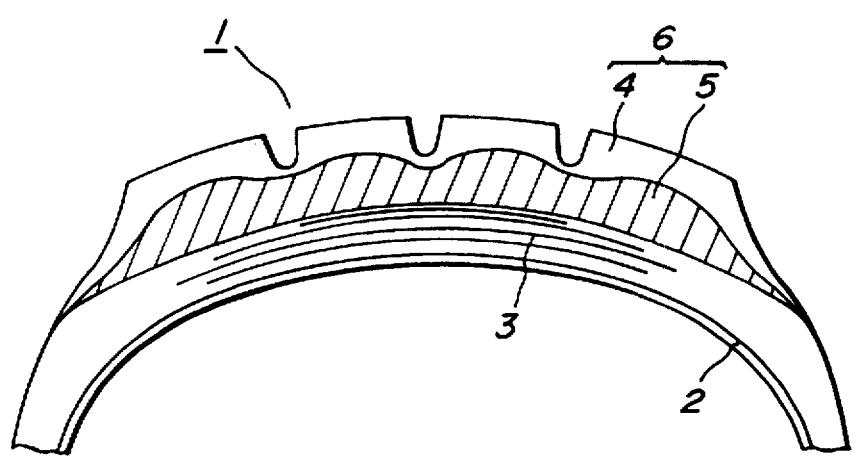
FIG. 1 is a diagrammatically partial section view of a pneumatic tire according to the invention.

In FIG. 1 is shown a pneumatic tire 1 according to the invention. This tire 1 comprises a radial carcass 2 comprised of a rubberized single steel cord ply, a belt 3 superimposed about a crown portion of the carcass and composed of four belt layers, and a tread 6 of a cap and base structure disposed on the belt 3 and comprised of a tread cap rubber 4 and a tread base rubber 5, in which the tread base rubber 5 is made from the rubber composition according to the invention as defined above.

As a rubber ingredient (i.e. matrix rubber) used in the rubber composition according to the invention, use may be made of natural rubber, polyisoprene rubber, polybutadiene rubber, styrene-butadiene copolymer rubber and the like or a blend thereof. A blend of natural rubber and/or polyisoprene rubber and styrene-butadiene copolymer rubber is usually used as a rubber blend.

Moreover, the rubber composition according to the invention may naturally be compounded with adequate amounts of additives usually used and selected from inorganic fillers such as carbon black, silica and the like, softening agents such as aromatic oil, spindle oil and the like, an antioxidant, a vulcanizing agent, a vulcanization accelerator, an accelerator activator and so on.

The blending method of the rubber composition according to the invention is not particularly restricted. That is, similar effects are obtained by any one of a wet blending method in a solvent and a dry blending method through a Banbury mixer or the like.

According to the invention, when the amount of the conjugated diene rubber component in the rubber-reinforcing thermoplastic resin is less than 10% by weight, the compatibility and covulcanizability with the matrix rubber are deteriorated to considerably lower the elongation at break and degrade the chipping resistance of the tire.

Preferably, the amount of the conjugated diene rubber component is within a range of 40–65% by weight because the above properties are considerably improved in this range. Moreover, when the amount exceeds 65% by weight, the amount of the resin component becomes less and sufficient hardness is not obtained in the resulting thermoplastic resin. Therefore, the function as the rubber-reinforcing thermoplastic resin is not sufficiently developed and the improvement of the performances of the tire made from the rubber composition containing such a thermoplastic resin becomes lower.

Moreover, the toluene insoluble matter of the conjugated diene rubber component in the rubber-reinforcing thermoplastic resin is preferably not more than 5% by weight. When it exceeds 5% by weight, the reinforcing action at an interface to the matrix rubber is insufficient and hence the deterioration of the fracture resistance is created as a whole of the tread base rubber.

And also, the conjugated diene rubber component is favorable to have an average particle size of 600–3500 Å. When the average particle size is less than 600 Å, it is insufficient to impart function as the rubber-reinforcing thermoplastic resin to the resulting rubber composition. When it exceeds 3500 Å, the action as a foreign matter becomes larger and hence the fracture resistance of the tire is lowered.

In the rubber-reinforcing thermoplastic resin according to the invention, when the glass transition temperature (Tg) is lower than 100° C., the cut resistance and chipping resistance at high temperature are poor. When it is higher than 140° C., the dispersibility into the matrix rubber is considerably degraded and also the chipping resistance is poor.

Further, when the amount of the rubber-reinforcing thermoplastic resin is less than 2 parts by weight based on 100 parts by weight of the rubber ingredient, the addition effect is not recognized. When it exceeds 50 parts by weight, the elongation at break lowers and the chipping resistance is poor.

In the rubber-reinforcing thermoplastic resin according to the invention, the conjugated diene rubber component provides satisfactory compatibility and covulcanizability with the rubber matrix, while the resin component raises the hardness of rubber as a whole at a low strain and gives a softness of rubber as a whole at a high strain. Therefore, when the rubber composition containing such a rubber-reinforcing thermoplastic resin according to the invention is applied to the tread base rubber, the chipping resistance, cut resistance, durability to heat-build-up and the like can be improved in the tread base rubber.

The following examples are given in illustration of the invention and are not intended as limitations thereof.

A rubber composition for tread base rubber is prepared by using each of rubber-reinforcing thermoplastic resins A–G as shown in Table 1 according to a compounding recipe as shown in Tables 2 and 3.

Then, a pneumatic tire having a tire size of 10.00 R20 is manufactured by using the above rubber composition in the base portion of the tire tread according to the usual manner.

The content of conjugated diene rubber component, the glass transition temperature (Tg) and the amount of toluene insoluble matter in Table 1 are measured as follows:

(1) Measurement of the content of conjugated diene rubber component.

As to the resins A–E, a sample of the rubber-reinforcing thermoplastic resin is decomposed in a thermal decomposition apparatus of Model JHP-3 (made by Nippon Bunseki Kogyo Co., Ltd.) at 590° C. for 3 seconds and passed through a column of DB 1 (made by J & W Scientific Corp. length: 30 m) of a gas chromatography (HP 5890A) within a temperature measuring range of 70°–300° C. at a temperature rising rate of 15° C./min, and then measured by means of a flame ionization detector to quantify an amount of butadiene by using a calibration curve of butadiene rubber previously measured as a standard.

Moreover, the content in the resins F and G is calculated by the ratio between the amount of rubber component and the amount of total monomer charged, and the conversion degree.

(2) Measurement of the glass transition temperature (Tg)

Tg. is measured by using a differential thermal analyzer (DSC 200, made by Seiko Denshi Kogyo K.K.) within a range of −120° C. to 180° C. at a temperature rising rate of 10° C./min under a nitrogen stream of 20 ml/min.

(3) Measurement of the amount of toluene insoluble matter (wt %).

1 g of the conjugated diene rubber component is added to 100 ml of toluene and left to stand at room temperature for 48 hours. After any insoluble matter is removed by filtration with a wire net of 100 mesh, a filtrate is distilled under a reduced pressure to remove toluene and then the resulting residue is dried to obtain toluene soluble matter (×g). The toluene insoluble matter is calculated according to the following equation:

$$\text{Amount of toluene insoluble matter (wt \%)} = [\{(1-X)(g)\}/1(g)] \times 100$$

The chipping resistance, cut resistance and durability to heat build-up in Table 3 are evaluated with respect to the above tire by the following methods.

Moreover, the evaluations of the chipping resistance and cut resistance are carried out after the tire is mounted onto a truck of 10 tons and run on a bad road under JIS normal internal pressure and load until the completion of wearing (maximum depth of remaining groove of not more than 3 mm).

(4) Chipping resistance

The number of chipped portions having an area of not less than 1 cm$^2$ is measured in a ground contact region of the tire.

(5) Cut resistance

The number of cuts reaching the belt is measured by peeling the tread base rubber from the tire tread.

(6) Durability to heat build-up (index)

The test tire is run on a drum according to a drum test of JIS D4230, during which a running distance until the occurrence of tire breakage is measured. The durability to heat build-up is represented by an index on the basis that the running distance of the control tire is 100. The larger the index value, the better the durability.

TABLE 1

|  | A | B | C | D | E | F | G |
|---|---|---|---|---|---|---|---|
| Kind of rubber-reinforcing thermoplastic resin | ABS10 made by Japan Synthetic Rubber Co., Ltd. *1 | UT30B made by Ube Saikon Co., Ltd. *2 | XT400 made by Japan Synthetic Rubber Co., Ltd. *2 | Cariflex 1101 made by Shell Chemical Co., Ltd. *3 | AS230 made by Japan Synthetic Rubber Co., Ltd. *4 | Formulation *5 | Formulation *5 |
| Conjugated diene rubber component (kind) | BR | BR | BR | BR | — | SBR | SBR |
| (% by weight) | 25 | 15 | 12 | 70 | 0 | 54 | 60 |
| Toluene insoluble matter (%) | 80 | 83 | 80 | 0 | 0 | 0 | 0 |
| Tg at high temperature side (°C.) | 102 | 119 | 143 | 90 | 102 | 126 | 108 |

*1 ABS10: acrylonitrile-butadiene-styrene resin
*2 UT30B, XT400: acrylonitrile-butadiene-styrene resin including a heat-resistant portion
*3 Cariflex 1101: trade name of styrene-butadiene block copolymer
*4 AS230: acrylonitrile-styrene resin
*5 Resins F and G are prepared as follows:

Into a reaction vessel provided with a reflux condenser, a thermometer and a stirrer are charged emulsion-polymerized SBR as a conjugated diene rubber component, 3 parts by weight of disproportionated rosin soap, 0.2 part by weight of t-dodecyl mercaptan and α-methylstyrene/acrylonitrile maleimide as a resin component, and then 0.25 part by weight of sodium pyrophosphate, 0.35 part by weight of dextrose, 0.005 part by weight of ferrous sulfate and 0.6 part by weight of cumene hydroperoxide are added to conduct polymerization for 4 hours. The resulting copolymer latex is solidified with sulfuric acid, washed with water and dried to obtain a desired resin F or G.

TABLE 2

|  | parts by weight |
|---|---|
| Natural rubber | 100 |
| Rubber-reinforcing thermoplastic resin | variable |
| Carbon black N330 | variable |
| Aromatic oil | 5 |
| Stearic acid | 2 |
| Paraffin wax | 2 |
| Antioxidant (Santoflex 13) *1 | 1 |
| Zinc oxide | 4 |
| Vulcanization accelerator (CZ) *2 | 1 |
| Sulfur | 2 |

*1: N-(1,3-dimethylbutyl)-N'-phenyl-p-phenylenediamine
*2: N-cyclohexyl-2-benzothiazole sulfenamide

TABLE 3

|  | Compounding amount (parts by weight) | | Evaluations | | |
|---|---|---|---|---|---|
|  | carbon black | rubber-reinforcing thermoplastic resin | chipped number | cut number | Durability to heat build-up |
| Comparative Example 1 (control) | 50 | — | 0 | 8 | 100 |
| Comparative Example 2 | 40 | — | 2 | 25 | 120 |
| Example 1 | 40 | 15(A) | 0 | 8 | 121 |
| Example 2 | 40 | 15(B) | 0 | 7 | 119 |
| Comparative Example 3 | 40 | 15(C) | 2 | 8 | 120 |
| Comparative Example 4 | 40 | 15(D) | 0 | 20 | 101 |
| Comparative Example 5 | 40 | 15(E) | 3 | 6 | 120 |
| Comparative Example 6 | 40 | 1(A) | 2 | 25 | 121 |
| Example 3 | 40 | 3(A) | 0 | 15 | 119 |
| Example 4 | 40 | 5(A) | 0 | 12 | 121 |
| Example 5 | 40 | 30(A) | 0 | 4 | 117 |
| Example 6 | 40 | 45(A) | 0 | 3 | 118 |
| Comparative Example 7 | 40 | 55(A) | 2 | 2 | 117 |
| Example 7 | 40 | 15(F) | 0 | 2 | 126 |
| Example 8 | 40 | 15(G) | 0 | 2 | 124 |

As seen from the results of Table 3, the pneumatic tires of Examples 1–8 are excellent in the chipping resistance, cut resistance and durability to heat build-up.

On the other hand, when the rubber-reinforcing thermoplastic resin and the amount thereof are outside the scope of the invention as seen from Comparative Example 1 (control) and Comparative Examples 2–7, the chipping resistance, cut resistance and durability to heat build-up in the tire can not simultaneously be improved.

As mentioned above, with this invention is possible to provide pneumatic tires having excellent chipping resistance, cut resistance and durability to heat build-up.

What is claimed is:

1. A pneumatic tire comprising; a tread of cap and base structure, said base structure of the tread being made from a rubber composition comprising 2–50 parts by weight of a rubber-reinforcing thermoplastic resin which is prepared by polymerizing a polymer as a conjugated diene rubber component with a resin component having a glass transition temperature of 100°–140° C., based on 100 parts by weight of rubber ingredient; said rubber-reinforcing thermoplastic resin consisting of 10–65% by weight of said conjugated diene rubber component and, the remainder of said rubber-reinforcing thermoplastic resin being said resin component having a glass transition temperature of 100°–140° C.

2. A pneumatic tire according to claim 1, wherein the rubber-reinforcing thermoplastic resin contains 40–65% by weight of the conjugated diene rubber component.

3. A pneumatic tire according to claim 1, wherein the conjugated diene rubber component is polybutadiene rubber or styrene-butadiene copolymer rubber having a toluene insoluble matter of not more than 5%.

4. A pneumatic tire according to claim 1, wherein the resin component in the rubber-reinforcing thermoplastic resin is made from at least one vinyl monomer selected from acrylonitrile, styrene and α-methylstyrene.

5. A pneumatic tire according to claim 1 wherein an average particle size of the conjugated diene rubber component is in the range of 600–3500 Å.

6. A pneumatic tire according to claim 1 wherein said tire further comprises a radial carcass and a belt superimposed about a crown portion of said carcass and radially below said base structure.

7. A pneumatic tire according to claim 6 wherein said carcass consists of a single rubberized steel cord ply.

8. A pneumatic tire according to claim 7 wherein said belt comprises 4 belt layers.

* * * * *